US008416865B2

(12) United States Patent
Zhang et al.

(10) Patent No.: US 8,416,865 B2
(45) Date of Patent: Apr. 9, 2013

(54) ADAPTIVE TRANSMISSION METHOD AND SYSTEM FOR WIRELESS COMMUNICATION SYSTEM

(75) Inventors: Jie Zhang, Beijing (CN); Hua Zhou, Beijing (CN); Jun Tian, Beijing (CN)

(73) Assignee: Fujitsu Limited, Kawasaki (JP)

( * ) Notice: Subject to any disclaimer, the term of this patent is extended or adjusted under 35 U.S.C. 154(b) by 844 days.

(21) Appl. No.: 12/495,945

(22) Filed: Jul. 1, 2009

(65) Prior Publication Data

US 2010/0002796 A1    Jan. 7, 2010

(30) Foreign Application Priority Data

Jul. 1, 2008    (CN) .......................... 2008 1 0131856

(51) Int. Cl.
*H04K 1/10* (2006.01)
(52) U.S. Cl.
USPC ......................................................... 375/260
(58) Field of Classification Search .................. 375/260, 375/241, 243; 370/203, 208
See application file for complete search history.

(56) References Cited

U.S. PATENT DOCUMENTS

| | | | | |
|---|---|---|---|---|
| 2003/0090994 | A1* | 5/2003 | Kakura | 370/208 |
| 2005/0099936 | A1* | 5/2005 | Fujii et al. | 370/203 |
| 2005/0169387 | A1* | 8/2005 | Ratakonda et al. | 375/243 |
| 2005/0237918 | A1* | 10/2005 | Asai et al. | 370/203 |
| 2006/0176966 | A1* | 8/2006 | Stewart et al. | 375/260 |
| 2006/0239179 | A1* | 10/2006 | Berkeman et al. | 370/208 |
| 2007/0268812 | A1* | 11/2007 | Yoon et al. | 370/203 |
| 2007/0274203 | A1* | 11/2007 | Kimura et al. | 370/208 |
| 2008/0018426 | A1* | 1/2008 | Liu | 340/3.9 |
| 2008/0175328 | A1* | 7/2008 | Lin et al. | 375/260 |
| 2008/0310519 | A1* | 12/2008 | Seyedi-Esfahani et al. | 375/241 |
| 2010/0040086 | A1* | 2/2010 | Kimura et al. | 370/474 |

FOREIGN PATENT DOCUMENTS

WO    2007136212    11/2007

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Computer Society and the IEEE Microwave Theory and Techniques Society IEEE Std 802.16e-2005 and IEEE Std 802.16-2004/Cor1-2005.
Chinese Second Office Action dated Jun. 11, 2012 issued in application No. 200810131856.7.

* cited by examiner

*Primary Examiner* — Jaison Joseph
(74) *Attorney, Agent, or Firm* — Smith, Gambrell & Russell, LLP

(57) ABSTRACT

The present invention provides a wireless transmission method and system based on maximum multi-path delay estimation. A wireless transmission method based on an estimation of maximum multi-paths delay, comprising: a communication apparatus involved in wireless communication estimates the maximum multi-paths delay of a currently received frame; the communication apparatus performs a quantization and coding on feedback information related with the estimated maximum multi-paths delay, and then sends the feedback information which has been subjected to the quantization and coding to an opposing communication apparatus which is in wireless communication with the communication apparatus; the opposing communication apparatus recovers the feedback information by demodulating and decoding the feedback information which has been subjected to the quantization and coding; the opposing communication apparatus performs an adaptive adjustment of wireless signals transmitted to the communication apparatus, based on the recovered feedback information. With this method, system parameters can be adaptively adjusted so as to that sufficiently improves the spectrum utilization efficiency of wireless resources (the throughput is increased by about 5%).

8 Claims, 6 Drawing Sheets

ADAPTIVE TRANSMISSION METHOD AND SYSTEM FOR WIRELESS COMMUNICATION SYSTEM

TECHNICAL FIELD

The present invention relates to a communication system, and provides an adaptive transmission method and unit based on maximum multi-path channel delay feedback in a wireless communication system. The adaptable wireless communication system may be any multi-carrier system or single-carrier block transmission system that use cyclic prefix (CP) or cyclic postfix.

BACKGROUND ART

The conventional single-carrier communication system, such as GSM, is easy to be influenced by the frequency-selective fading channel to produce serious inter-symbol interference, and then the quality of the wireless communication will be deteriorated. In order to eliminate mutual interferences between adjacent symbols, an equalization technique is required, so as to use the energy of the multi-path channels concentratedly, but the complex equalization technique will greatly increase the cost of implementing the system. The multi-carrier wireless communication evenly divides the frequency-selective fading wideband channel into many frequency flat fading channels, and only a single-tap frequency equalizer is needed at the receiving end, thus the receiver equalization algorithm of the system is notably simplified. In the multi-carrier communication, in order to overcome the frequency-selective fading characteristic of the channel, a cyclic prefix (CP) shall be added to the forhead of each OFDM symbol, and the CP shall be removed after passing through the multi-path channels. Thus the convolution operation between the signal and channel will be converted into a cyclic convolution.

As the CP is a simple repetition of the last portion of the current OFDM signal and it does not carry any useful information, the usage of the CP reduces the system spectrum utilization efficiency. In order to eliminate the interference from OFDM symbol completely, the CP length shall be longer than the maximum multi-path delay of the channel. In some actual systems, the CP length may be selected as $\frac{1}{32}$, $\frac{1}{16}$, $\frac{1}{8}$, $\frac{1}{4}$, etc. of the hits of the OFDM symbol. E.g., in an OFDM system of 1024 points FFT, the CP length may be 32, 64, 128 or 256 sample points. Here, the multiple selections of the CP length provide certain freedom to the system designer, and a long CP can sufficiently protect the OFDM signal from being influenced by inter-symbol interference, but the cost is that the spectrum utilization efficiency is obviously reduced.

On the other hand, as the spectrum leakage of wireless signal interferes other signals occupying the adjacent spectrum resources, in order to avoid interference between different wireless signals, a protective band of certain width shall be reserved at both ends of the used frequency, i.e., Virtual sub-carriers (VC) transmitting no information.

Related contents are recorded in the following two prior literatures:
1. [Non-patent literature 1]: IEEE P802.16e/D12—Draft IEEE Standard for Local and Metropolitan area Networks—Part 16: Air Interface for Fixed and Mobile Broadband Wireless Access Systems—Amendment for Physical and Medium Access Control Layers for Combined Fixed and Mobile Operation in Licensed Bands, Institute of Electrical and Electronic Engineers, New York, N.Y., USA, October 2005.

2. [Patent literature 1]: A patent application with the patent publication number of WO2007136212A, and the invention title being "A Method of Configuring Wireless Resource for Effective and Efficient Transmission in a Wireless Communication System".

In the existing wireless communication system, a long CP is used to prevent an OFDM signal from being influenced by inter-symbol interference in the time-domain, and a VC is used to prevent an interference on adjacent wireless signals by the spectrum leakage of a wireless signal. Thus in the existing wireless communication system, there are mainly two different cases of spectrum resource wastes: the first case is: in order to protect the effective data in time-domain, CP shall be used, since the length of the maximum multi-path delay is unknown, the CP length is usually far longer than the actually required length, thus the number of OFDM symbols transmitted in certain period is unnecessarily reduced; and the second case is: in order to protect the effective data in frequency-domain, VC shall be used, similarly, since the length of the maximum multi-path delay is unknown, the VC length is usually far longer than the actually required length, thus the number of sub-carriers transmitting effective data in the same frequency resource is reduced.

Therefore, in order to improve the spectrum effectiveness of the multi-carrier system, it is necessary to improve the system parameter setting from the above two aspects. The present application just improves the defects in the prior art to solve the above problems, and provides an adaptive transmission method and system based on a measured channel maximum multi-path delay.

SUMMARY OF THE INVENTION

The present application estimates a channel maximum multi-path delay at the receiving end, quantizes the information and feeds back to the transmitting end for the users' dispatching (users having approximately same maximum multi-path delay are sorted into one group), then improves the utilization efficiency of wireless frequency resources for multiple users in a same group, via specific signal processing techniques. Herein two signal processing techniques are adopted: 1) keeping a fixed CP length, since the maximum multi-path delay of the actual channel is far less than the CP length, reducing the minor lobe of OFDM signal by using a time-domain windowing method, so that the out of band attenuation is steeper, and finally reducing the number of Virtual sub-carriers; and 2) using short CPs for all users in the group, so that the number of OFDM symbols transmitted in the same time is increased.

A brief summary of the present invention is given as follows to provide a basic understanding of certain aspects of the present invention. But it shall be comprehended that this summary is not an exhaustive summary of the present invention. It does not intend to define the key part of important part of the present invention, or limit the scope of the present invention. The purpose is only to give some concepts about the present invention in a simplified form, as a preface of the subsequent detailed descriptions. For a person skilled in the art, the following aspects of the present invention and the technical solution defined by the accompanied independent claims can be in any possible appropriate combinations with the examples in the present invention and/or the dependent claims.

A first aspect of the present invention provides a wireless transmission method based on an estimation of maximum multi-paths delay, comprising: a communication apparatus involved in wireless communication estimates the maximum multi-paths delay of a currently received frame; the communication apparatus performs a quantization and coding on feedback information related with the estimated maximum multi-paths delay, and then sends the feedback information which has been subjected to the quantization and coding to an opposing communication apparatus which is in wireless communication with the communication apparatus; the opposing communication apparatus recovers the feedback information by demodulating and decoding the feedback information which has been subjected to the quantization and coding; the opposing communication apparatus performs an adaptive adjustment of wireless signals transmitted to the communication apparatus, based on the recovered feedback information.

In the wireless transmission method of a second aspect of the present invention, the opposing communication apparatus reduces a length of a cyclic prefix in a leader sequence of OFDM signal transmitted to the communication apparatus, or windows time-domain signal transmitted to the communication apparatus so as to reduce the number of virtual carrier waves, based on the recovered feedback information.

The wireless transmission method according to the above second aspect, wherein: window functions of Hamming window, Hanning window, Raised Cosine Window and Triangular window are used for windowing the time-domain signal.

The wireless transmission method according to the above first or second aspect, wherein: the feedback information may be a difference between a length of a cyclic prefix of the signal currently received by the communication apparatus and the estimated maximum multi-paths delay, the maximum multi-paths delay per se, or a signal indicating whether the maximum multi-paths delay is shorter than the length of the cyclic prefix of the signal currently received.

The wireless transmission method according to the above first or second aspect, wherein: in a signal x(t) received through multi-paths channels, the communication apparatus slides a time window [t, t+N/2], calculates values of correlation coefficients $$\sum_{\substack{t_0=t \\ -L_{CP}<t<2L_{CP}}}^{t+N/2-1} |x(t_0) \cdot x^*(t_0+N/2)|^2$$

corresponding to respective time windows obtained by sliding the time window, finds out the maximum value $C_{max}$ among the calculated correlation coefficients, determines left and right end points of a range of a correlation coefficient being the maximum value, as well as time subscripts of initial sample points of the time windows corresponding to the left and right end points, and estimates the maximum multi-paths delay based on the time subscripts, wherein t=−$L_{CP}$, . . . , 0, . . . , 2 $L_{CP}$, $L_{CP}$ is the length of a cyclic prefix CP, N is the number of sample points in portions of the preamble sequence of OFDM signal received by the communication apparatus, except the cyclic prefix, and the first sample point of the preamble sequence CP is recorded as x(0), $t_0$ means initial end point of the respective windows, and ( )* means conjugate operation.

The wireless transmission method according to the above first or second aspect, wherein: the communication apparatus performs an interpolation to frequency-domain response of the current channel calculated based on pilot frequency information of the current frame of the received signal, so as to estimate the frequency-domain response of the current channel, and then estimate time-domain response of the current channel based on the estimated frequency-domain response, and next estimate the maximum multi-paths delay of the currently received frame to be the number of sample points of which the module value of the time-domain response in the current frame is larger than a predetermined value.

The wireless transmission method according to the above first or second aspect, wherein: the method is adaptable for multi-carrier system based on multi-antenna technique.

The wireless transmission method according to the above first or second aspect, wherein: the opposing communication apparatus sorts communication parties having same feedback information into one group, and transmits data to the communication parties with CPs of the same length, or windows time-domain signals transmitted to the communication parties with windows of the same length.

A third aspect of the present invention provides a wireless transmission system based on an estimation of maximum multi-paths delay, comprising: a communication apparatus and an opposing communication apparatus which are in wireless communication with each other; the communication apparatus comprising: a maximum multi-paths delay measuring unit for estimating a maximum multi-paths delay of a frame currently received from the opposing communication apparatus; a feedback unit for performing a quantization and coding on feedback information related with the estimated maximum multi-paths delay, and then sends the feedback information which has been subjected to the quantization and coding to the opposing communication apparatus; the opposing communication apparatus comprising: a feedback information demodulating/decoding unit for receiving, demodulating and decoding the feedback information which has been subjected to the feedback information which has been subjected to the quantization and coding, so as to recover the feedback information; an adaptive adjusting unit for adaptively adjusting a wireless signal transmitted to the communication apparatus, based on the recovered feedback information.

The wireless transmission system according to the above third aspect, wherein the feedback unit feedbacks feedback information related to the maximum multi-path delay with an interval of one or more frames.

The wireless transmission system of a fourth aspect of the present invention, wherein: the adaptive adjusting unit comprises a cyclic prefix shortening unit or a windowing preprocessing unit, wherein the cyclic prefix shortening unit reduces a length of a cyclic prefix in a preamble sequence of OFDM signal transmitted to the communication apparatus based on the recovered feedback information; and the windowing preprocessing unit windows time-domain signal transmitted to the communication apparatus, based on the recovered feedback information, so as to reduce the number of virtual carrier waves.

The wireless transmission system according to the above fourth aspect, wherein: the windowing preprocessing unit windows the time-domain signal by using window functions of Hamming window, Hanning window, Raised Cosine Window and Triangular window.

The wireless transmission system of the third or fourth aspect of the present invention, wherein: the feedback information may be a difference between a length of a cyclic prefix of the signal currently received by the communication apparatus and the estimated maximum multi-paths delay, the maximum multi-paths delay per se, or a signal indicating whether the maximum multi-paths delay is shorter than the length of the cyclic prefix of the signal currently received.

The wireless transmission system of the third or fourth aspect of the present invention, wherein: in a signal x(t)

received through a multi-paths channel, the maximum multi-paths delay measuring unit slides a time window [t, t+N/2], calculates values of correlation coefficients $$\sum_{\substack{t_0=t \\ -L_{CP}<t<2L_{CP}}}^{t+N/2-1} |x(t_0) \cdot x^*(t_0+N/2)|^2$$

corresponding to respective time windows obtained by sliding the time window, finds out the maximum value Cmax among the calculated correlation coefficients, determines left and right end points of a range of a correlation coefficient being the maximum value, as well as time subscripts of initial sample points of the time windows corresponding to the left and right end points, and estimates the maximum multi-paths delay based on the time subscripts, wherein t=−LCP, . . . , 0, . . . , 2 LCP, LCP is the length of a cyclic prefix CP, N is the number of sample points in portions of the preamble sequence of OFDM signal received by the communication apparatus, except the cyclic prefix, and the first sample point of the preamble sequence CP is recorded as x(0), t0 means initial end point of the respective windows, and ( )* means conjugate operation.

The wireless transmission system of the third or fourth aspect of the present invention, wherein: the maximum multi-paths delay measuring unit performs an interpolation to frequency-domain response of the current channel calculated based on pilot frequency information of the current frame of the received signal, so as to estimate the frequency-domain response of the current channel, and then estimate time-domain response of the current channel based on the estimated frequency-domain response, and next estimate the maximum multi-paths delay of the currently received frame to be the number of sample points of which the module value of the time-domain response in the current frame is larger than a predetermined value.

The wireless transmission system of the above third or fourth aspect, wherein: the opposing communication apparatus sorts communication parties having the same feedback information into a group, and transmits data to the communication parties with CPs of the same length, or windows time-domain signals transmitted to the communication parties with windows of the same length.

The wireless transmission system of the above third or fourth aspect, wherein: the wireless transmission system may be a multi-carrier system based on multi-antenna technique.

A fifth aspect of the present invention provides a computer program, which enables the computer to perform the steps in the wireless communication method mentioned above.

A sixth aspect of the present invention provides a storage medium, on which the computer program as the fifth aspect of the present invention is stored.

Hereinafter the embodiments of the present invention are described in details in conjunction with the drawings.

DETAILED DESCRIPTIONS OF PREFERRED EMBODIMENTS

The basic concept of the present invention is: to measure in a wireless communication system, a maximum transmission time delay caused by multi-path transmission and existing in transmission of a current frame, and adjust the length of CP or the number of VC adopted for data transmission, based on feedback information related to the measured maximum multi-path delay, so as to transmit effective data in a longer period, and improve the utilization efficiency of frequency spectrum of the communication system.

The preferred embodiments of the present invention are described as follows in conjunction with the drawings.

The First Embodiment

Figure 1:
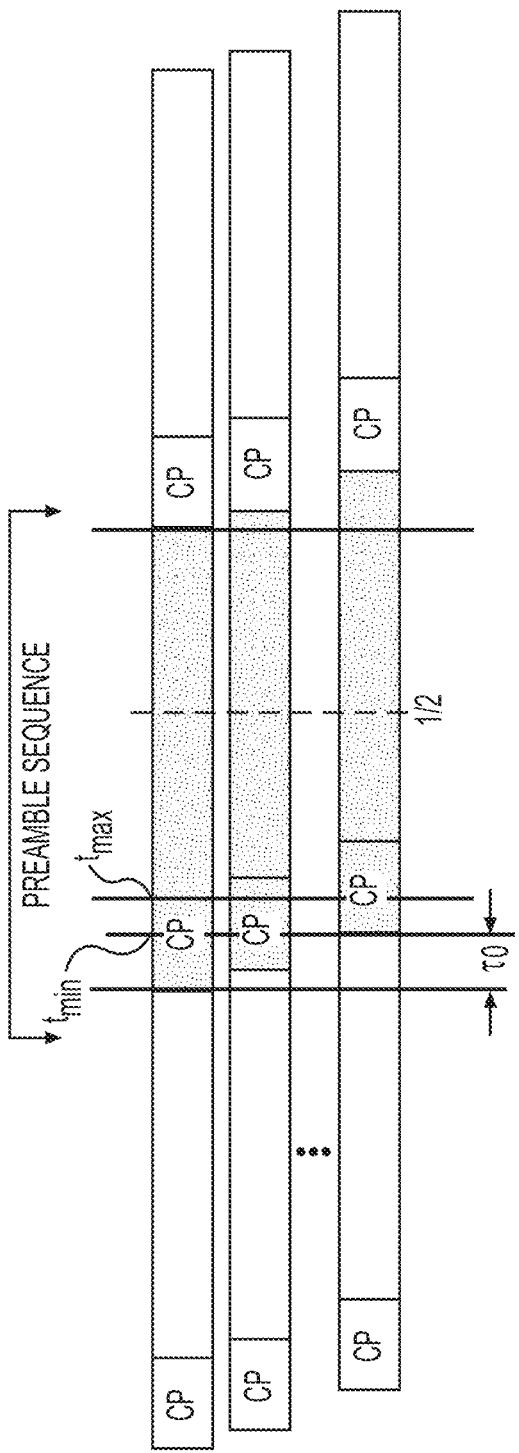
FIG. 1 is a schematic diagram showing an OFDM signal having passed a multi-path channel.

As shown in FIG. 1, the maximum transmission delay in each transmission path caused by multi-path transmission and existing in the wireless communication transmission is $\tau_0$, the length of a portion (the overlapped portion of the CPs of multiple paths) of CP which is not influenced by an inter-symbol interference after transmitted though the multi-path channel, is represented as $t_{max}-t_{min}$, thus an estimation of the maximum multi-path delay of the channel could be represented as $L=CP-(t_{max}-t_{min})$, thus the estimation L of the maximum multi-path delay can be acquired only by determining the length of the portion (the overlapped portion of the CPs of multiple paths) of CP which is not influenced by an inter-symbol interference after transmitted though the multi-path channel.

Figure 2:
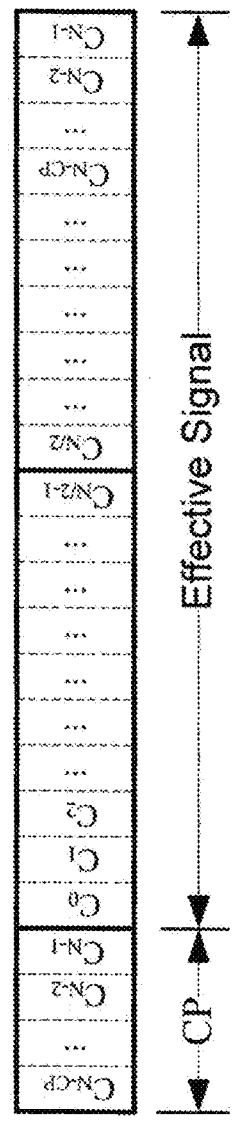
FIG. 2 is a schematic diagram indicating a format of preamble sequence of the OFDM signal.

The overlapped portion can be calculated based on the inherent characteristics of the preamble sequence of the orthogonal frequency division multiplexed OFDM signal, and the detailed calculation process of the overlapped portion of the CPs of multiple paths (denoted as: $t_{max}-t_{min}$) are described as follows: the preamble sequence of the OFDM is shown in FIG. 2, wherein the preamble sequence comprising a CP and two repeated sequences, and the data in the two repeated sequences are the same, e.g., the first sequence "$C_0 C_1 C_2 \ldots C_{N/2-1}$" and the second sequence "$C_{N/2} \ldots C_{N-2} C_{N-1}$" in the effective signal are the same, while data of the tail of the latter sequence of the repeated sequences is same as that of the tail of the CP, e.g., both being "$C_{N-CP} \ldots C_{N-2} C_{N-1}$". As the preamble sequence has the above characteristics, the following equation will be satisfied when $\tau_0 < t < CP$ (i.e., t is located at the overlapped portion of the CPs of multiple paths)

$$x(t)=x(t+N/2) \quad (1)$$

As shown in FIG. 2, here N is a number of sample points in portions of the preamble sequence except the CP, and x(t) is a received signal having passing the multi-path channel (when the influence of noise is not considered), which could be expressed as:

$$x(t)=h_0 s(t)+h_1 s_{-1}(t-1)+\ldots+h_{\tau_0} s_{-1}(t-\tau_0) \qquad (2)$$

wherein s(t) denotes an original signal, $h_0$ denotes the channel fading coefficient of a path whose delay is 0, and by analogy in turn, $h_{\tau_0}$ denotes the channel fading coefficient of a path with the delay being $\tau_0$.

As the received signal satisfies equation (1), it can be determined that when t falls in the overlap interval [$\tau_0$, CP] of the CPs of multiple paths, the correlation coefficient $$\sum_{\substack{t_0=t \\ \tau_0<t<CP}}^{t+N/2-1} |x(t_0) \cdot x^*(t_0 + N/2)|^2$$

reaches the maximum value, the reason is as follows:
when t is outside the interval [$\tau_0$, CP], $$\sum_{t_0=t}^{t+N/2-1} |x(t_0) \cdot x^*(t_0 + N/2)|^2 = \sum_{t_0=t}^{\tau_0-1} \left| \begin{array}{c} x(t_0) \cdot \\ x^*(t_0+N/2) \end{array} \right|^2 + \sum_{t_0=\tau_0}^{t+N/2-1-\tau_0} \left| \begin{array}{c} x(t_0) \cdot \\ x^*(t_0+N/2) \end{array} \right|^2,$$

as $x(t_0) \neq x(t_0+N/2)$ when $t<\tau_0$, it could be obtained that $$\sum_{t_0=t}^{\tau_0-1} |x(t_0) \cdot x^*(t_0+N/2)|^2 < \sum_{t_0=t+N/2-\tau_0}^{t+N/2-1} |x(t_0) \cdot x^*(t_0+N/2)|^2,$$

thus the correlation coefficient at this time is smaller than that when t falls in the interval. The maximum correlation coefficient when t falls in the interval is represented as $C_{max}$.

In order to determine the minimum initial point value $t_{min}$ and maximum initial point value $t_{max}$ among all time windows corresponding to the above maximum correlation coefficients, the time window [t, t+N/2] could be slid so that the window initial point t=$-L_{CP}, \ldots, 0, \ldots, 2 L_{CP}$ ($L_{CP}$ means the length of the CP, and assuming the time subscript of the first sample point of the CP to be 0), and calculating the correlation coefficient $$\sum_{\substack{t_0=t \\ -L_{CP}<t<2L_{CP}}}^{t+N/2-1} |x(t_0) \cdot x^*(t_0 + N/2)|^2$$

corresponding to each of the time windows; finding out the maximum value interval among the calculated correlation coefficients, two end points corresponding to the maximum value interval (in this interval, all correlation coefficients are $C_{max}$) shall respectively correspond to the left end point $t_{min}$ and right end point $t_{max}$ of the overlap portion, thus the maximum multi-path delay can be estimated based on the previous equation L=CP$-(t_{max}-t_{min})$.

Preferably, in view of influences resulted from such as noise, a predetermined constant α can be selected (e.g., 70%, 75%, 80%, and the value can be selected appropriately according to the actual system or accuracy requirement), then α·$C_{max}$ is calculated. The time subscripts t of sample points at the positions where the values $$\sum_{\substack{t_0=t \\ -L_{CP}<t<2L_{CP}}}^{t+N/2-1} |x(t_0) \cdot x^*(t_0 + N/2)|^2$$

are respectively at left side and right side of the maximum value $C_{max}$ and are closest to α·$C_{max}$ are respectively marked as tmin and tmax, and the estimation L of the maximum multi-path delay is obtained based on the previous equation L=$L_{CP}-(t_{max}-t_{min})$.

After the estimation L of the maximum multi-path delay is obtained, the communication apparatus in wireless communication transmits the feedback information related to the estimated maximum multi-path delay to the opposing communication apparatus.

In details, the communication apparatus can perform quantization encoding on the estimation L of the maximum multi-path delay, e.g., when the measured maximum multi-path delay of the current data frame is 51, it is quantized with a quantization step value 16, firstly, it is approximately counted as 64 and divided by 16 to get a result of 4, then coding the value 4 to obtain a coded binary data 100, next the communication apparatus transmits the coded data 100 to the opposing wireless communication apparatus. Herein a quantization step means: quantizing a digit by using the quantization step (e.g. 4, 8, 16, 32, etc.), and dividing it with the quantization step, then converting the result into a binary data. With such quantization method, the data amount to be transmitted in commutation may be smaller.

The opposing communication apparatus in wireless communication will reduce the length of the CP based on the received coded data about the maximum multi-path delay, in details, the opposing communication apparatus can demodulate and decode the received signal 100 to acquire the quantized maximum multi-path delay L (here is 64), select a proper length of CP based on the estimation L, and transmit data wirelessly to the communication apparatus by using the selected CP length. Thus a CP, which is far shorter than that adopted when the maximum multi-path delay is unknown, can be effectively selected. Therefore, OFDM symbol data transmitted in certain period is increased and the transmission efficiency is improved.

In details, when a CP is to be selected, the CP length can be selected as longer than the estimation L by 8, 16 or 32. Of course, a person skilled in the art will know that: the more the selected CP length is longer than the estimation L, the stronger the data protection capability of the CP will be, however the effective data transmitted by the system in certain period will be reduced at the same time; oppositely, the less the selected CP length is longer than the estimation L, the more effective data will be transmitted by the system in certain period, however the data protection capability of the CP will relatively be weaker. Thus a compromise can be made between the two aspects according to requirements of transmission efficiency and signal accuracy in actual communication. Herein the CP length is assumed as 64+16=80.

Preferably, when informing the opposing communication apparatus of the estimated maximum multi-path delay, it is allowable to perform a quantization and coding on the difference or ratio between the CP and the maximum multi-path delay L, instead of directly performing a quantization and coding on the maximum multi-path delay, so as to reduce the number of transmitted bits and further improve the transmission efficiency. E.g., under the condition that the CP length currently used by the wireless frame received by the communication apparatus is 128, and the actual channel delay measured based on the current frame is 100, therefore, if a quantization and coding are directly performed for the delay 100 by using a quantization step of 16, the delay is firstly quantized as 108, then the quantized data 108 is divided by 16 to get a result of 8, which is coded as a binary data 1000 with the bit number being 4. While, If a quantization and coding on a difference between the CP and the maximum multi-path delay L is to be performed, the difference between the CP and the maximum multi-path delay L shall be calculated firstly, i.e., 128−100=28, then the difference is quantized as 32, and the quantized data 32 is divided by 16 to get a result of 2, which is coded as a binary data 10, thus the required bit number is 2.

According to the requirements of the channel bandwidth and feedback interval in the wireless communication system, each of the communication parties respectively feeds back the quantized and coded value of the channel maximum multi-path delay of the current frame measured by themselves, the feedback interval may be a frame or a super frame composed of multiple frames, i.e., the communication parties each can either feeds back a quantized and coded value of the corresponding maximum multi-path delay each time one frame is received, or feeds back a quantized and coded value of the corresponding maximum multi-path delay each time multiple frames are received.

A person skilled in the art will know that the CP transmitted by the system can be kept shortest, if feeding back a quantized and coded value of the corresponding maximum multi-path delay each time a frame is received and making the opposing communication apparatus to adjust the CP length, but the system shall be adjusted in real-time continuously, therefore the system is not stable enough. While, if only feeding back a quantized and coded value of the corresponding maximum multi-path delay each time multiple frames are received and making the opposing communication apparatus to adjust the CP length, the system can transmit signals with a relatively stable CP length, but the CP length in some frames will not be the shortest, i.e., certain transmission efficiency will be sacrificed. Therefore, an appropriate compromise can be made between the two aspects according to actual requirement of the system transmission.

In addition, the communication apparatus can also only inform the opposing communication apparatus of indication information that indicates whether the maximum multi-path delay of the current channel is shorter than the CP of the current signal, the communication apparatus performs a quantization and coding on the indication information, and the opposing communication apparatus recovers the indication information by demodulating and decoding the received information after quantization and coding, and appropriately shortens the CP length of the signal transmitted to the communication apparatus.

The Second Embodiment

The method for calculating the channel maximum multi-path delay in the second embodiment is same as that in the first embodiment, and it also improves the system transmission efficiency by reducing the CP length. The second embodiment differs from the first embodiment in follows: in this embodiment, the communication apparatus calculates the maximum multi-path delay, performs a quantization and coding on the feedback information related to the maximum multi-path delay, and transmits the quantized and coded value of the feedback information to the opposing communication apparatus, in this way, the opposing communication apparatus can obtain feedback information of all communication parties needing to communicate therewith, then the opposing communication apparatus groups the communication parties needing to communicate therewith based on these feedback information, such that all communication parties in each group have the same feedback amount of the maximum multi-path delay, i.e., having the same CP length demand, therefore the opposing communication apparatus can transmit wireless data to all communication parties in a group by using the same CP, thereby improves the channel transmission efficiency as much as possible, with the precondition that the transmission data is correctly received.

The Third Embodiment

The method for calculating the channel maximum multi-path delay in the third embodiment is same as that in the first embodiment, and the third embodiment differs from the first embodiment in follows: after the communication apparatus performing a quantization and coding on the maximum multi-path delay estimation, taking data which has been subjected to the quantization and coding as feedback information, and transmitting it to the opposing communication apparatus, the opposing communication apparatus improves the system transmission efficiency by reducing the number of VC using the feedback information, instead of by reducing the CP length.

As mentioned above, during a wireless communication, besides performing the protection on transmitted data by using CP in time-domain, protective bands of certain width are usually reserved at both ends of the used frequency, i.e., VC which does not transmit any data, so as to prevent the spectrum leakage of signal or system from interfering on other signals or systems occupying adjacent spectrum resources.

Figure 3:
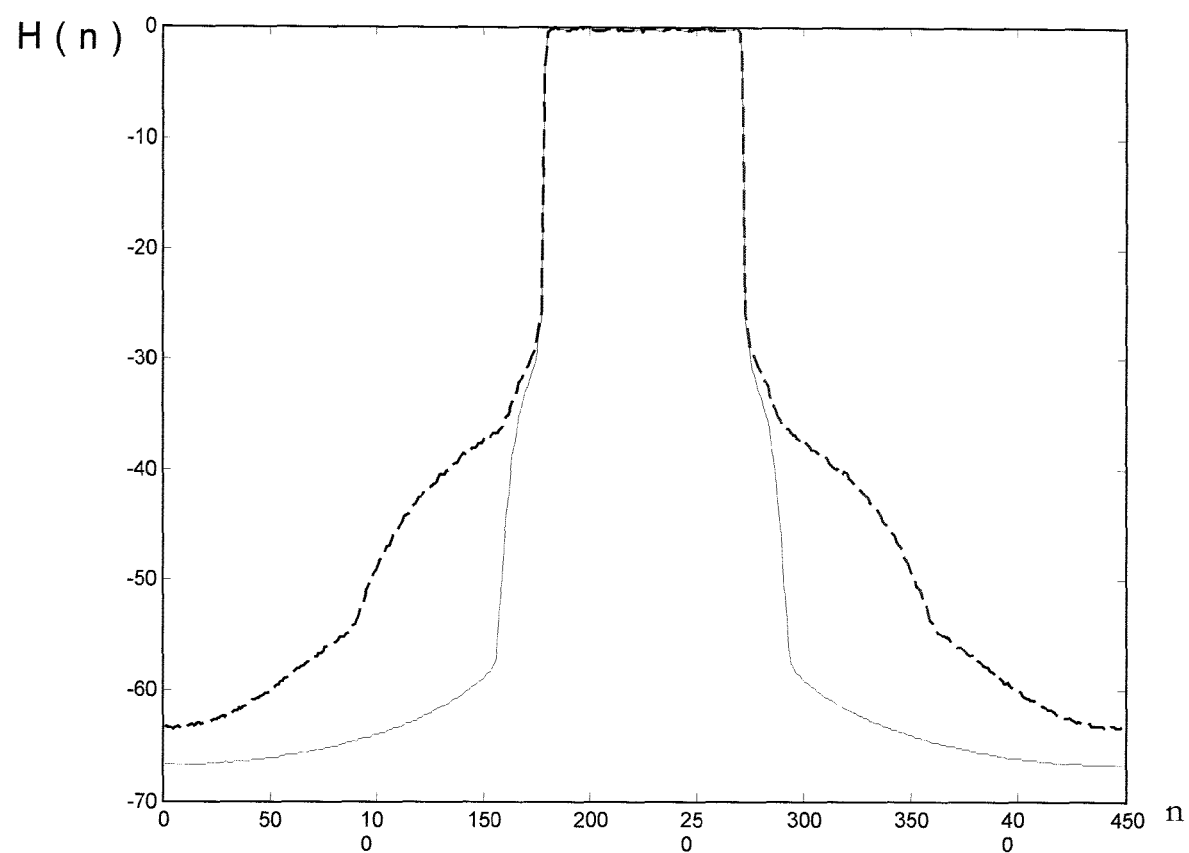
FIG. 3 shows a variation of signal frequency spectrum after windowing a transmitted signal in the time-domain.

Therefore, the signal transmission efficiency can be improved by changing either the CP length or the VC number. In this embodiment, the opposing communication apparatus retains the CP length unchanged, while changes the spectrum shape of the transmitted signal by windowing time-domain signal. Since the CP length is far longer than the actual channel maximum multi-path delay, there are certain number of CP sample points not influenced by the multi-path channel. Thus the CP per se has a protection effect on the received signal, and the signal spectrum can drop more steeply at the signal edge by using the method of time-domain windowing, as shown in FIG. 3. Wherein, the dashed line represents the spectrum where the time-domain of the signal is not windowed, and the real line represents the spectrum where the time-domain of the signal is windowed. It can be seen that when the time-domain of the signal is windowed, the spectrum is steeper at the edge. As the signal spectrum is steeper at the edge, its interference on the signals transmitted at the adjacent spectrum is smaller, hence the number of required VCs used as protective bands in the frequency-domain can be reduced, thus the number of protective bands, i.e., the VCs, can be reduced. At that time, the window width is the estimation of the maximum multi-path delay calculated based on a threshold $\beta$, so as to improve the transmission capability of the system.

Herein a person skilled in the art will know that the selection of the threshold β is also a compromise between the system transmission efficiency and accuracy, and the smaller β is, the closer to its real value is the estimation of the maximum multi-path delay, but the slower the edge of the spectrum signal corresponding to time-domain characteristics of the current channel drops, and the more VCs will be required, thus the system transmission efficiency will decrease. Oppositely, the larger β is, the larger the error between the estimation of the maximum multi-path delay and the real delay value will be, but the more steeply the edge of the spectrum signal corresponding to time-domain characteristics of the current channel drops, and the less VCs will be required, thus the system transmission efficiency can be improved, while the cost is weakening the signal protection capability. It can be seen that the threshold β can be selected appropriately according to the actual requirements of system transmission efficiency and transmission accuracy.

The window functions can be in the form of Raised Cosine window, Triangular window, Hamming window, Hanning window, etc.

The Fourth Embodiment

The fourth embodiment differs from the third embodiment as follows: in this embodiment, after the communication apparatus calculating the maximum multi-path delay, performing a quantization and coding on the estimation of the maximum multi-path delay or difference or ratio between the current CP and estimation of the maximum multi-path delay, and transmitting that to the opposing communication apparatus, the opposing communication apparatus can acquire delay information of all communication parties needing to communicate therewith, then the opposing communication apparatus groups the communication parties needing to communicate therewith according to these delay information, so that all communication parties in each group have the same delay feedback amount, thus the opposing communication apparatus can window the time-domain signals transmitted to the each of the communication parties by using the same window function, so as to change the spectrum shape of the signals transmitted to each of the communication parties.

The Fifth Embodiment

The method for measuring the estimation of the channel maximum multi-path delay in the fifth embodiment is different from that in the first embodiment, wherein pilot signals P (n) periodically exist in frequency-domain of original signal transmitted by the opposing communication apparatus in wireless communication, the pilot signals and their positions N in the transmitted signal are predefined. Thus a frequency-domain response Hp of the current channel can be estimated by using a frequency-domain response value R (n) of the pilot signal P (n) of the wireless signal received by the communication apparatus, in a equation:

$$\overline{H}_p = R(n)/P(n); \quad (3)$$

wherein n means positions of the sample points corresponding to the respective pilot signals.

Figure 4A:
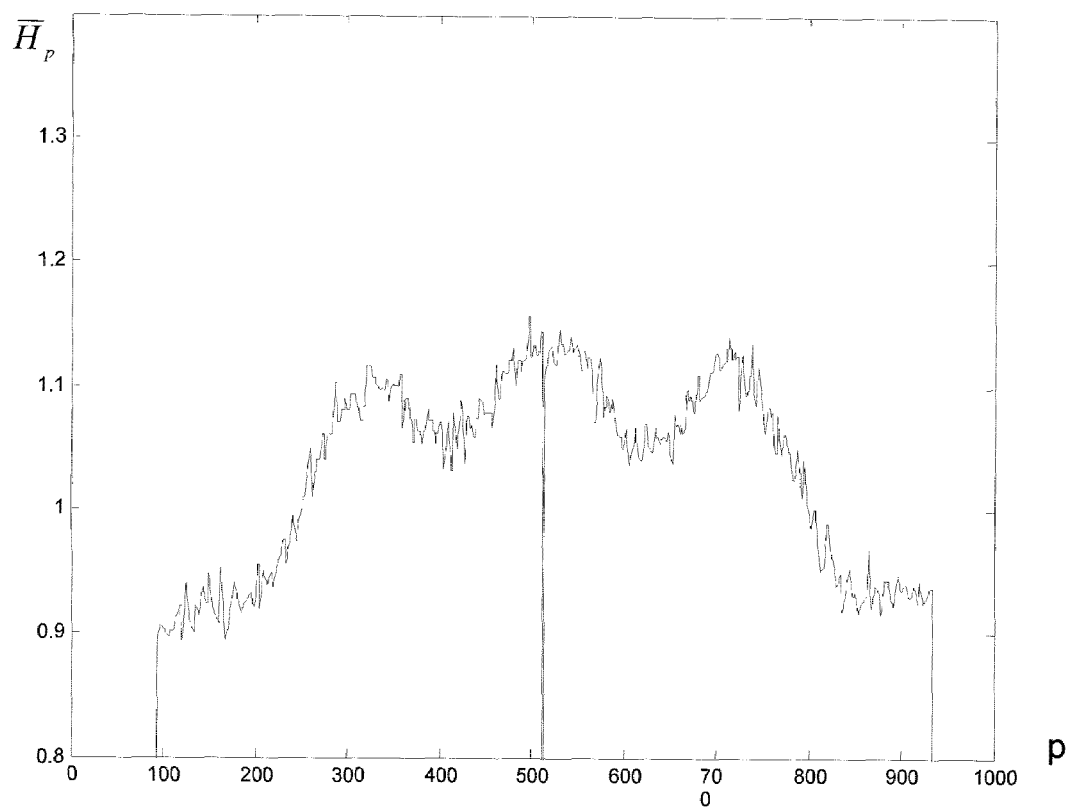
FIG. 4a indicates a channel frequency-domain response of the current channel estimated based on pilot information of the current frame.

FIG. 4a shows a frequency-domain response $\overline{H}_p$ of the current channel acquired by using pilot signal, then a linear interpolation is performed to the channel frequency-domain response $\overline{H}_p$ calculated by using the pilot signal, to acquire a frequency-domain channel estimation of the current channel, which is denoted as $\overline{H}_0, \overline{H}_1, \ldots \overline{H}_{N-1}$.

Figure 4B:
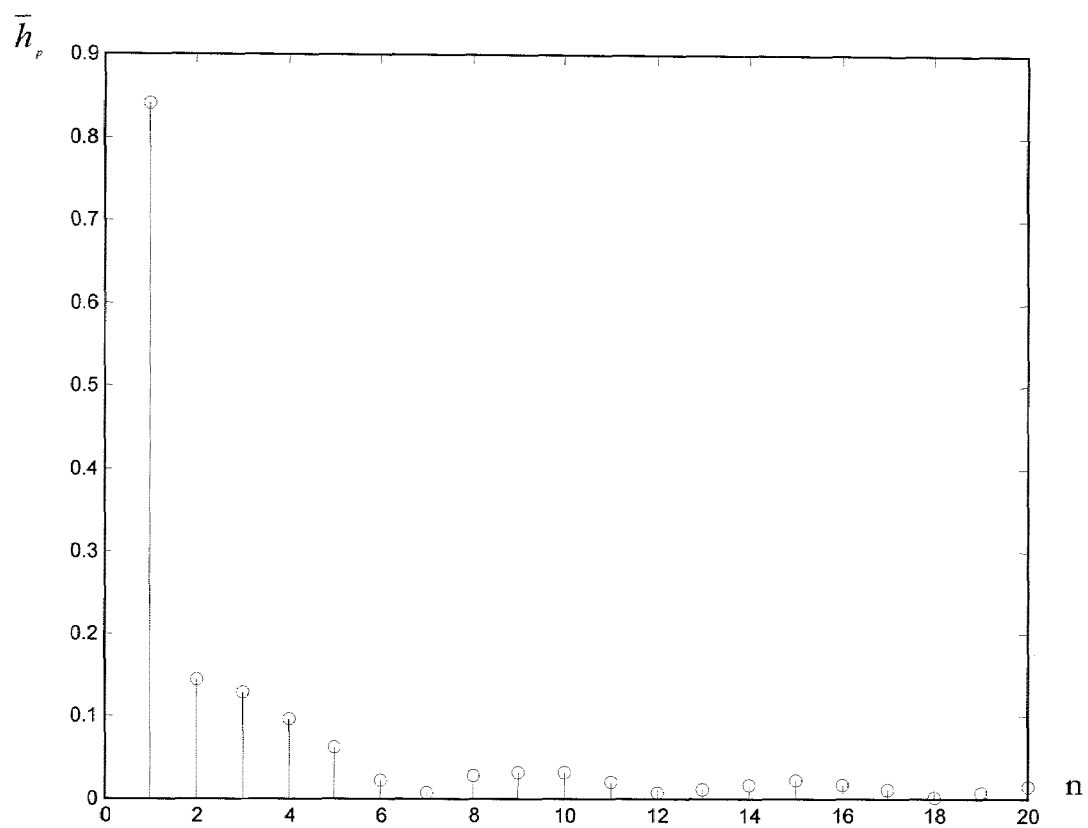
FIG. 4b indicates an interpolation to the estimated channel frequency-domain response shown in FIG. 4a, and a channel time-domain response estimated based on a reverse Fourier transformation of the interpolation.

Next, a reverse Fourier transformation is performed to the frequency-domain channel estimation $\overline{H}_0, \overline{H}_1 \ldots \overline{H}_{N-1}$ of the current channel, so as to acquire time-domain response of the current channel as shown in FIG. 4b, which is marked as $\overline{h}_0, \overline{h}_1, \ldots \overline{h}_{N-1}$ wherein:

$$\overline{h}_l = 1/N \sum_{k=0}^{N-1} \overline{H}_k \exp\left(j\frac{2\pi kl}{N}\right) \quad (4)$$

wherein $0 \leq k \leq N-1$, $0 \leq l \leq N-1$, and k and 1 are integers.

Finally, setting a threshold β, ignoring the response values of time-domain response whose module values is less than the threshold β, only finding out the number L of multi-paths of which the module values of time-domain response $\overline{h}_l$ is larger than β, and taking L as the estimation of the maximum multi-path delay.

Similar to the first embodiment, the communication apparatus receiving the wireless signal can directly transmit the maximum multi-path delay which has been subjected to the quantization and coding to the opposing communication apparatus, or perform a quantization and coding on the difference or ratio between the current CP and the estimation of the maximum multi-path delay and then transmit it to the opposing communication apparatus.

The opposing communication apparatus demodulates and decodes the coded data related to the maximum multi-path delay to acquire delay information from the communication apparatus.

Next, the opposing communication apparatus improves the transmission efficiency of the channel, based on the same method as that in the first embodiment, by reducing the CP length, and herein is not repeated.

The Sixth Embodiment

The method for calculating the channel maximum multi-path delay in the sixth embodiment is same as that in the fifth embodiment, and the sixth embodiment differs from the fifth embodiment as follows: the communication apparatus calculates the maximum multi-path delay, performs a quantization and coding on the estimation of the maximum multi-path delay or difference or ratio between the current CP and the estimation of the maximum multi-path delay, and transmits to the opposing communication apparatus, so that the opposing communication apparatus can acquire delay information of all communication parties needing to communicate therewith, then the opposing communication apparatus groups the communication parties needing to communicate therewith according to these delay information, so that all communication parties in each group have the same delay feedback amount, i.e., the same CP length demand, thus the opposing communication apparatus can transmit wireless data to all communication parties in a group by using the same CP, so as to improve the channel transmission efficiency as much as possible, under the precondition that the transmission data is correctly received.

The Seventh Embodiment

The method for calculating the channel maximum multi-path delay in the seventh embodiment is same as that in the fifth embodiment, and the seventh embodiment differs from the fifth embodiment as follows: after the communication apparatus performing a quantization and coding on the estimation of the maximum multi-path delay, taking data which has been subjected to the quantization and coding as feedback information and transmitting it to the opposing communication apparatus, the opposing communication apparatus reduces the number of the VCs by using the feedback information, instead of improving the channel transmission efficiency by reducing the CP length.

In this embodiment, the opposing communication apparatus retains the CP length unchanged, while changes the spectrum shape of the transmitted signal by windowing time-domain signal. The detailed method for reducing the number of the VCs by windowing the time-domain is similar as that in the third embodiment, and herein is not repeated.

The Eighth Embodiment

The eighth embodiment differs from the seventh embodiment only in that: in this embodiment, the communication apparatus calculates the maximum multi-path delay, performs a quantization and coding on the estimation of the maximum multi-path delay or difference or ratio between the current CP and the estimation of the maximum multi-path delay, and transmits it to the opposing communication apparatus, so that the opposing communication apparatus can acquire delay information of all communication parties needing to communicate therewith, then the opposing communication apparatus groups the communication parties needing to communicate therewith according to these delay information, so that all communication parties in each group have the same delay feedback amount, then windows time-domain signals transmitted to each of the communication parties based on the same multi-path delay, i.e., windows the time-domain of the signals with the same window length, so that spectrums of signals transmitted by the opposing communication apparatus to the plural communication parties in a group drop steeply at the signal edges, thus the channel transmission efficiency can be improved.

Of course, it is obvious that the method of making the spectrum edge of signal drop more steeply by windowing is adaptable not limited to the OFDM system, and any wireless communication system that uses pilot signal can use this method to improve the system transmission efficiency.

Figure 5:
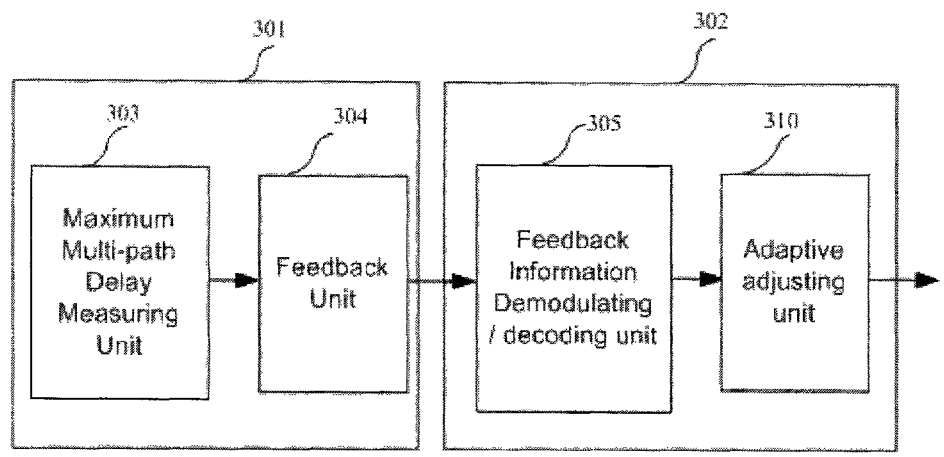
FIG. 5 shows a wireless communication system in which an opposing communication apparatus utilizes feedback information received from a communication apparatus to adaptively adjust a signal transmitted to the communication apparatus.

FIG. 5 shows a wireless transmission system that improves the channel transmission efficiency by using information related to the maximum multi-path delay received from the communication apparatus. Wherein a communication apparatus 301 (only one communication apparatus 301 is shown herein, but it is obvious that the number of the communication apparatus 301 may be more than 1) firstly uses a channel delay measuring unit 303 to estimate the maximum multi-path delay L of the channel from the opposing communication apparatus to itself, then uses a feedback unit 304 to perform a quantization and coding, and transmits the maximum multi-path delay L having been subjected to the quantization and coding to an opposing communication apparatus 302; the opposing communication apparatus 302 firstly uses a feedback information demodulating/decoding unit 305 to demodulate and decode feedback information related to the coded maximum multi-path delay received from the communication apparatus 301, and it may use an adaptive adjusting unit 310 to adjust signals transmitted to the communication apparatus, based on the decoded feedback information.

Wherein, the adaptive adjusting unit 310 may be a windowing preprocessing unit 307, or a CP shortening unit 308, i.e., it is alternative to use the CP shortening unit 308 to perform a processing of reducing CP for the communication apparatus 301, or to use the windowing preprocessing unit 307, based on the method of time-domain windowing, to perform a processing of reducing VCs for the communication apparatus 301. The CP shortening unit 308 can adopt the methods recorded in the first, second, fifth or sixth embodiment to reduce the CP, and the windowing preprocessing unit 307 can adopt the methods recorded in the third, fourth, seventh or eighth embodiment to reduce the VCs, and herein are not described repeatedly.

Figure 6:
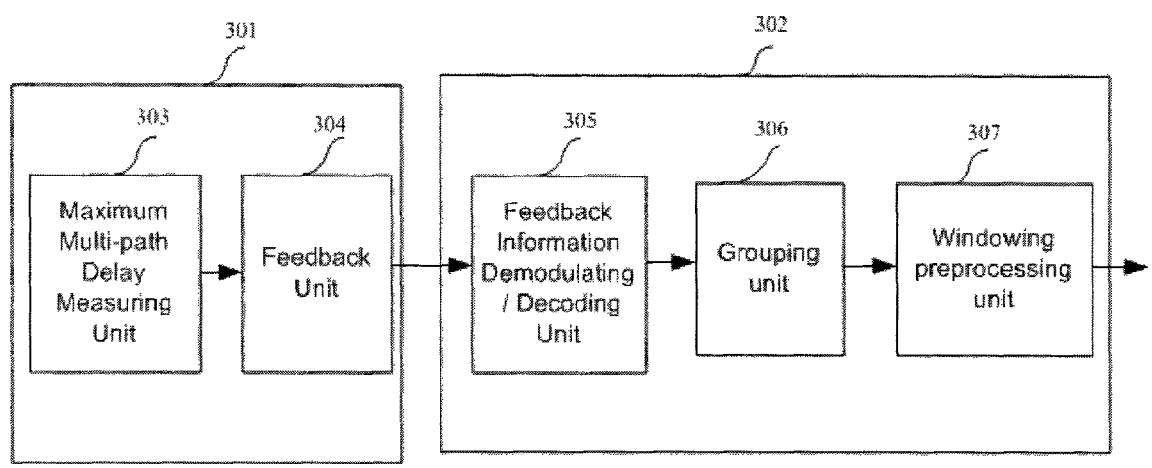
FIG. 6 shows a wireless communication system which adopts the windowing processing on time-domain signal of the present invention.
Figure 7:
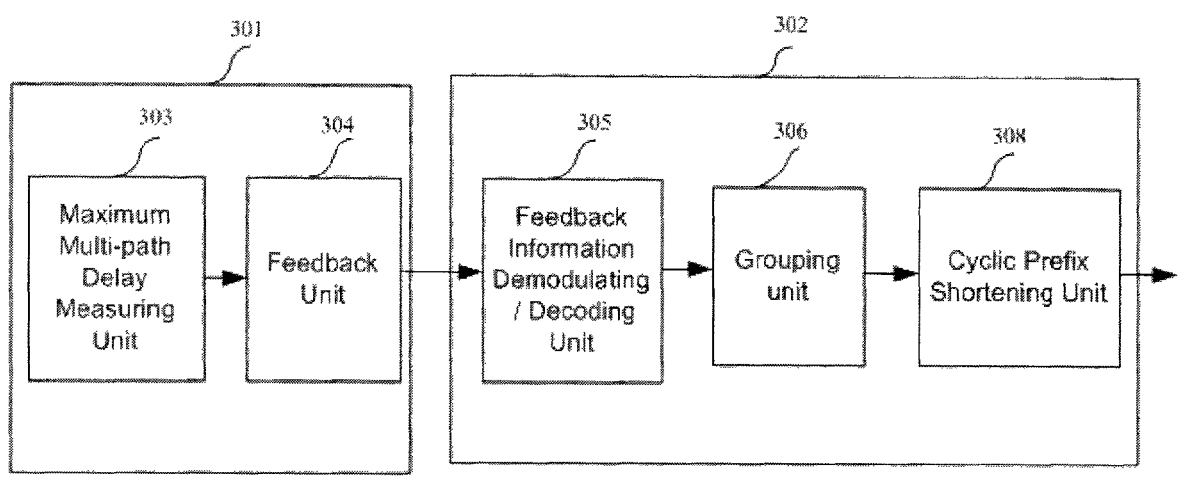
FIG. 7 shows a wireless communication system which adopts shortened preamble sequence CP of the present invention.

It is obvious that although FIG. 6 and FIG. 7 show a user grouping unit 306, a windowing preprocessing unit 307, and a CP shortening unit 308, it can be seen from the descriptions of the adjusting process of signal transmission in the preceding embodiments, the user grouping unit 306 is just a preferred embodiment, and the windowing preprocessing unit 307 and the CP shortening unit 308 can be alternatively selected.

With the method of reducing the CP length, if the maximum channel delay fed back by all users in a group is far less than the CP length used by the current frame, it means that much CP signals are wasted in the current transmission process, thus the CP lengths for all users in the group can be reduced, therefore more OFDM symbols could be transmitted in a same time interval, hence improves the system transmission capability. E.g., in an OFDM system of 1024 points FFT, the CP length of the current frame is 256 sample points, and if it decreases to 64 sample points, the system throughput will increase by about 18%, and the transmission efficiency will be greatly improved.

Adopting the method of time-domain signal windowing to reduce the number of VCs can obviously improve system transmission capability, under the condition that the system Mask requirement is satisfied. E.g., in an OFDM system of 1024 points FFT, when 160 VCs decreases to 124 VCs, the system throughput will increase by about 4.2%.

Besides, the above scheme, which improves the channel transmission efficiency by reducing the CP length in the transmitted OFDM signal, or reducing the number of VCs via windowing the time-domain, is adaptable not only to a communication system of mono transmitting/receiving antenna, but also to a communication system based on multi-antenna technique. With respect to the system adopting multiple antennas, the adjustment method for the CP lengths or VC numbers of the signals transmitted by the antennas is same as those described in the above embodiments, and herein is not described unnecessarily.

In addition, it is obvious that the adaptive transmission methods and the operations performed in the unit can also be implemented in a form of computer-executable program stored in various machine-readable storage mediums.

Furthermore, the object of the invention can also be achieved via the following method: the storage medium storing the executable program codes is provided directly or indirectly to a system or equipment, and the computer or CPU in the system or equipment reads and executes the program codes.

At that time, only if the system or equipment has a function of executing a program, the embodiments of the invention will not be limited to the program, and the program may be of any form, such as object program, interpreter-executed program, or script program provided to the operating system.

The above machine-readable storage medium include, but not limited, various memories and storage units, semiconductor devices, disc units, and other mediums suitable for storing information.

Moreover, a client computer can also implement the invention by connecting the corresponding websites on the internet, loading the computer program codes of the invention and installing to the computer, and then executing the program.

Although the embodiments of the invention are described in details in conjunction with the drawings, it shall be understood that the above described embodiments are only used for explaining the invention, and do not constitute any definition to the invention. For a person skilled in the art, various changes and modifications can be made to the above embodiments, without deviating from the substance and range of the invention. Therefore, the range of the invention is only limited by the accompanied claims and their equivalents.

The invention claimed is:

1. A wireless transmission method based on an estimation of maximum multi-paths delay, comprising
   a communication apparatus involved in wireless communication estimates the maximum multi-paths delay of a currently received frame;
   the communication apparatus performs a quantization and coding on feedback information related with the estimated maximum multi-paths delay, and then sends the feedback information which has been subjected to the quantization and coding to an opposing communication apparatus which is in wireless communication with the communication apparatus;
   the opposing communication apparatus recovers the feedback information by demodulating and decoding the feedback information which has been subjected to the quantization and coding;
   the opposing communication apparatus windows the time-domain signal transmitted to the communication apparatus so as to reduce the number of virtual carrier waves, based on the recovered feedback information.

2. The wireless transmission method of claim 1, wherein:
   the feedback information may be a difference between a length of a cyclic prefix of the signal currently received by the communication apparatus and the estimated maximum multi-paths delay, the maximum multi-paths delay per se, or a signal indicating whether the maximum multi-paths delay is shorter than the length of the cyclic prefix of the signal currently received.

3. The wireless transmission method of claim 1, wherein:
   in a signal x(t) received through multi-paths channels, the communication apparatus slides a time window [t, t+N/2], calculates values of correlation coefficients $$\sum_{\substack{t_0=t \\ -L_{CP}<t<2L_{CP}}}^{t+N/2-1} |x(t_0) \cdot x^*(t_0+N/2)|^2$$

corresponding to respective time windows obtained by sliding the time window, finds out the maximum value $C_{max}$ among the calculated correlation coefficients, determines left and right end points of a range of a correlation coefficient being the maximum value, as well as time subscripts of initial sample points of the time windows corresponding to the left and right end points, and estimates the maximum multi-paths delay based on the time subscripts, wherein $L_{CP}$ is the length of a cyclic prefix CP, $t=-L_{CP}, \ldots, 0, \ldots, 2L_{CP}$, N is the number of sample points in portions, except the cyclic prefix, of the preamble sequence of OFDM signal received by the communication apparatus, and the first sample point of the preamble sequence CP is recorded as x(0), $t_0$ means initial end point of the respective windows, and ( )* means conjugate operation.

4. The wireless transmission method of claim 1, wherein:
   the communication apparatus performs an interpolation on frequency-domain response of the current channel calculated based on pilot frequency information of the current frame of the received signal, so as to estimate the frequency-domain response of the current channel, and then estimates time-domain response of the current channel based on the estimated frequency-domain response, and next estimates the maximum multi-paths delay of the current frame to be the number of sample points of which the module value of the time-domain response in the current frame is larger than a predetermined value.

5. A wireless transmission system based on an estimation of maximum multi-paths delay, comprising:
   a communication apparatus and an opposing communication apparatus which are in wireless communication with each other;
   the communication apparatus comprising:
   a maximum multi-paths delay measuring unit for estimating a maximum multi-paths delay of a frame currently received from the opposing communication apparatus;
   a feedback unit for performing a quantization and coding on feedback information related with the estimated maximum multi-paths delay, and then sends the feedback information which has been subjected to the quantization and coding to the opposing communication apparatus;
   the opposing communication apparatus comprising:
   a feedback information demodulating/decoding unit for receiving, demodulating and decoding the feedback information which has been subjected to the feedback information, so as to recover the feedback information;
   an adaptive adjusting unit for adaptively adjusting a wireless signal transmitted to the communication apparatus, based on the recovered feedback information,
   the adaptive adjusting unit comprises a windowing preprocessing unit, wherein the windowing preprocessing unit windows time-domain signal transmitted to the communication apparatus, based on the recovered feedback information, so as to reduce the number of virtual carrier waves.

6. The wireless transmission system of claim 5, wherein:
   the feedback information may be a difference between a length of a cyclic prefix of the signal currently received by the communication apparatus and the estimated maximum multi-paths delay, the maximum multi-paths delay per se, or a signal indicating whether the maximum multi-paths delay is shorter than the length of the cyclic prefix of the signal currently received.

7. The wireless transmission system of claim 5, wherein:
   in a signal x(t) received through a multi-paths channel, the maximum multi-paths delay measuring unit slides a time window [t, t+N/2], calculates values of correlation coefficients $$\sum_{\substack{t_0=t \\ -L_{CP}<t<2L_{CP}}}^{t+N/2-1} |x(t_0) \cdot x^*(t_0+N/2)|^2$$

corresponding to respective time windows obtained by sliding the time window, finds out the maximum value $C_{max}$ among the calculated correlation coefficients, determines left and right end points of a range of a correlation coefficient being the maximum value, as well as time subscripts of initial sample points of the time windows corresponding to the left and right end points, and estimates the maximum multi-paths delay based on the time subscripts, wherein $L_{CP}$ is the length of a cyclic prefix CP, $t=-L_{CP}, \ldots, 0, \ldots, 2 Lcp$, N is the number of sample points in portions, except the cyclic prefix, of the preamble sequence of OFDM signal received by the communication apparatus, and the first sample point of the preamble sequence CP is recorded as $x(0)$, $t_0$ means initial end point of the respective windows, and $(\ )^*$ means conjugate operation.

8. The wireless transmission system of claim 5, wherein:
the maximum multi-paths delay measuring unit performs an interpolation on frequency-domain response of the current channel calculated based on pilot frequency information of the current frame of the received signal, so as to estimate the frequency-domain response of the current channel, and then estimates time-domain response of the current channel based on the estimated frequency-domain response, and next estimates the maximum multi-paths delay of the current frame to be the number of sample points of which the module value of the time-domain response in the current frame is larger than a predetermined value.

* * * * *